United States Patent [19]
Reuter et al.

[11] Patent Number: 5,927,827
[45] Date of Patent: Jul. 27, 1999

[54] PRESSURE EQUALIZATION IN A PROPORTIONALLY REGULATED FLUID SYSTEM

[75] Inventors: David Fredrick Reuter, Beavercreek; James William Zehnder, II, Huber Heights; Gary Lee Johnston, Pleasant Hill, all of Ohio

[73] Assignee: General Motors Corporation, Detroit, Mich.

[21] Appl. No.: 08/746,818

[22] Filed: Nov. 18, 1996

[51] Int. Cl.[6] ........................................................ B60T 8/40
[52] U.S. Cl. ........................ 303/116.2; 303/113.2; 303/113.5
[58] Field of Search ............................. 303/113.5, 113.2, 303/87, 33, 116.1, 116.2, 188, 189

[56] References Cited

U.S. PATENT DOCUMENTS

| 5,383,719 | 1/1995 | Farr ....................................... | 303/113.2 |
| 5,690,396 | 11/1997 | Johnston et al. ................... | 303/113.2 X |

FOREIGN PATENT DOCUMENTS

| 2630517 | 1/1978 | Germany ........................... | 303/113.5 |
| 1104792 | 2/1968 | United Kingdom ............... | 303/113.5 |

*Primary Examiner*—Peter M. Poon
*Attorney, Agent, or Firm*—Jeffrey A. Sedler; Robert M. Sigler

[57] ABSTRACT

A braking system generally provides pressure equalization between the sides of a split braking circuit. The amount of equalization provided is limited to enable the introduction of purposely induced pressure variances. A result is that unintentional pressure variations are moderated and intentional target pressure variations are easily obtainable. The braking system provides power braking operation in response to a manually actuated master cylinder. Fluid pressure is transmitted through isolation valves directly to the wheel brakes. The braking system also provides power operation in response to a powered pump. The pump delivers pressurized fluid through a controllable supply valve. When the supply valve is open, the isolation valve(s) are shifted to provide open fluid communication path between proportional pressure control valves and the wheel brakes. The pressure equalization effecting device is isolated from the master cylinder pressurized circuit during base brake operation.

10 Claims, 1 Drawing Sheet

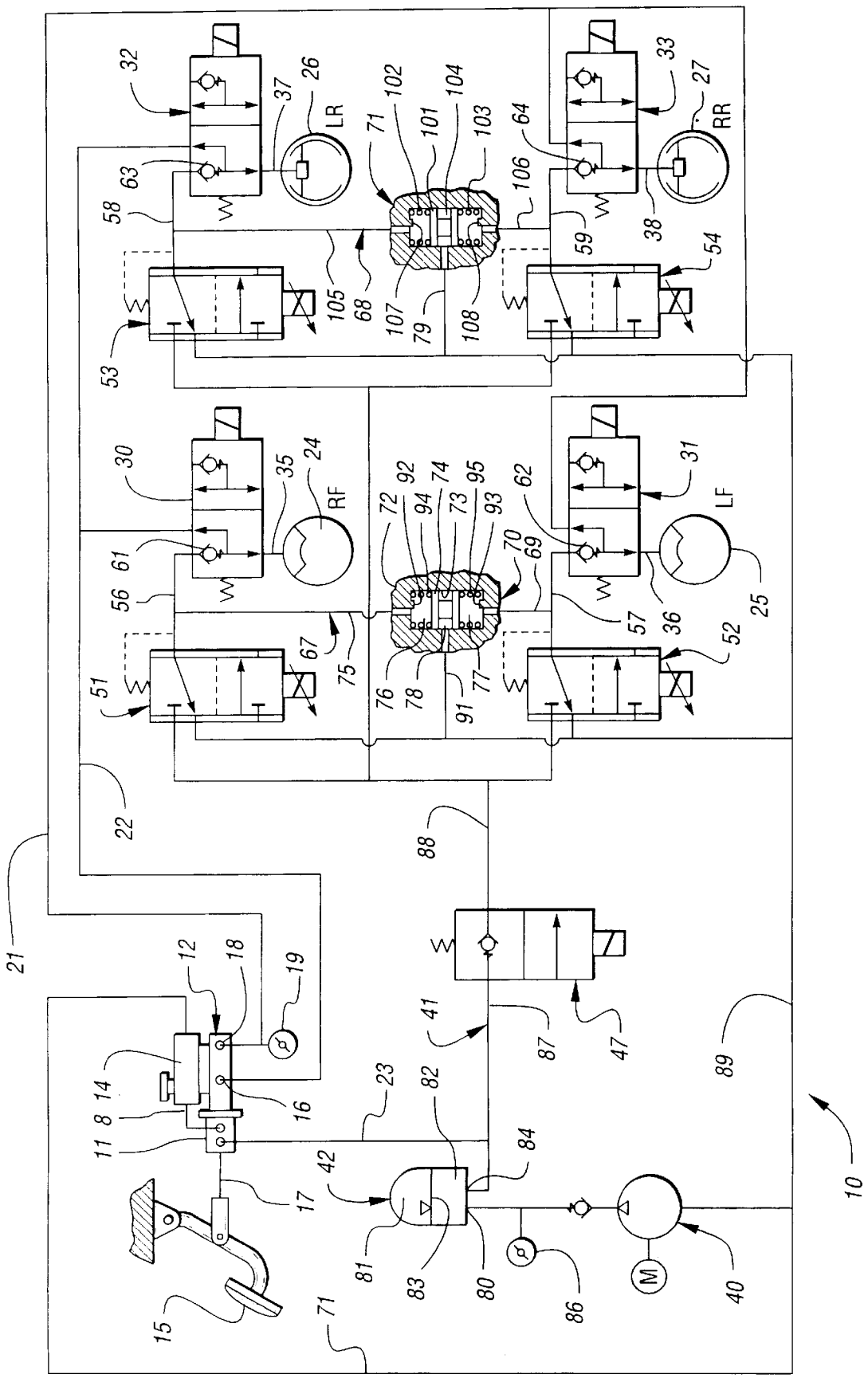

PRESSURE EQUALIZATION IN A PROPORTIONALLY REGULATED FLUID SYSTEM

TECHNICAL FIELD

The present invention relates to pressure equalization in a proportionally regulated fluid system and more particularly, to the equalization of pressure between distinct channels of a split fluid system that operates with independent proportional valve pressure control.

BACKGROUND OF THE INVENTION

Proportional regulation in a fluid system is the action of a mechanism to vary fluid output pressure relative to the fluid input pressure in response to one or more varying control factors. The output pressure is generally controlled to effect a desired response from a fluid actuated element. This type of a control mechanism has useful application in the control of automotive braking systems.

It is typical for an automotive braking system to operate in a traditional base brake mode wherein manual actuation of a master cylinder effects a desired application of the wheel brakes. In addition to the base brake mode, braking systems are often capable of controlling vehicle deceleration through anti-lock operation, controlling vehicle acceleration through traction control operation and improving lateral and longitudinal vehicle stability through stability enhancement systems which provide a level of dynamic handling augmentation. Such multi-functional brake systems are becoming increasingly more common and therefore, providing an effective and economical multi-functional system is desirable.

Brake apply system designs are known wherein the pressure applied to a vehicle's wheel brakes is controlled by an electronic unit that evaluates several parameters and delivers a control signal to a hydraulic modulator that sets the wheel brake pressure. A key parameter used to determine the appropriate braking pressure is the driver's command, delivered as an input on the brake pedal. Braking systems that provide several distinct operating modes require a mechanism to "modulate" the braking pressure at the wheel brakes based on parameters other than, or in addition to, the driver's application of force to the brake pedal. A modulator typically includes a pressure generation mechanism and a means of controlling delivery of the generated pressure to the wheel brakes. This may take the form of a pump and proportional hydraulic valve, a pump with a pair of two way valves or a movable-piston variable pressure chamber device. The number and arrangement of these elements included in a braking system is determined by the system layout and selected control scheme.

There are many operating conditions to consider in designing a multi-functional braking system. During braking operation on a uniform road surface for a vehicle moving in a substantially straight line, the friction characteristic at the tire to road interface is similar for all four wheels. If the brakes are applied to slow the vehicle, it is preferable for the application rate to be consistent between the left and the right sides of the vehicle, to inhibit the introduction of brake induced yaw. If brakes are applied according to an automatic control mechanism for target path correction of the vehicle in maneuvering situations, then the application rates are selected to purposely introduce a yaw moment. Additionally, anti-lock and traction control braking operation often varies braking pressure between the individual wheel brakes of a vehicle. Therefore, it is preferable to have the ability to provide consistent braking pressure across the sides of a vehicle and also to have the ability to vary the braking pressure across the sides of a vehicle. The operating conditions are complicated by friction coefficient variances between wheels of the vehicle and other operational conditions.

SUMMARY OF THE INVENTION

In accordance with an aspect of the present invention, a braking system generally provides pressure equalization between the sides of a split braking circuit. The amount of equalization provided is limited to enable the introduction of purposely induced pressure variances. A result is that pressure variations are moderated and intentional target pressure variations are easily obtainable. The braking system provides power braking operation in response to a manually actuated master cylinder and in response to a motor driven pump.

A preferred embodiment of the present invention includes a manually actuated and power boosted master cylinder that operates to pressurize dual braking circuits. Fluid pressure is transmitted through isolation valves directly to the wheel brakes. A check valve feature preferably prevents the transmission of pressure to those parts of the braking circuits that include the pressure equalization effecting devices. This isolates the compliancy introduced by the devices from the master cylinder and the wheel brakes during base brake operation.

In automatic power braking operation of the braking system to slow the associated vehicle, a powered pump delivers pressurized fluid through a controllable supply valve. When the supply valve is open, the isolation valve(s) are shifted to provide open fluid communication paths between proportional pressure control valves and the wheel brakes. The check valve features prevent the transmission of fluid pressure to the master cylinder during automatic power braking operation.

Providing fluid pressure to actuate the wheel brakes is achieved by actuating the proportional valves which are controlled to effect a target braking pressure. The target braking pressure is set by a programmable electronic controller which utilizes various data. Any side to side pressure variation that could result by independent operation of the proportional valves is avoided by operation of the pressure equalization effecting devices. Therefore, during automatic power braking operation to slow the vehicle, the fluid pressure applied to the front wheel brakes is substantially equal. Similarly, the fluid pressure applied to the rear wheel brakes is substantially equal.

BRIEF DESCRIPTION OF THE DRAWINGS

The FIGURE is a diagrammatic illustration of a vehicle braking system in accordance with the present invention.

DESCRIPTION OF THE PREFERRED EMBODIMENT

Referring to the Figure, illustrated is a fluid pressure regulation system embodied as brake system 10. Brake system 10 is capable of conventional manual base brake operation and is also capable of electrically controlled brake operation in response to manual actuation or various sensed vehicle operational parameters for traditional braking, anti-lock braking, traction control operation, vehicle handling augmentation through a stability enhancement system, and automatic power braking operation.

The braking system 10 includes a conventional master cylinder 12 with an associated fluid reservoir 14. The master cylinder 12 is manually actuated in response to the application of force to the brake pedal 15 through the push rod 17. A hydraulic power booster 11 is associated with the master cylinder 12 to intensify the force applied by the brake pedal 15 and apply the intensified force to the master cylinder 12. The master cylinder 12 includes two output ports 16 and 18. Through the output ports 16 and 18, the master cylinder 12 is capable of actuating two braking channels through the master cylinder pressure input lines 21 and 22.

The braking system 10 is arranged in a diagonally split manner so that the master cylinder pressure input line 21 supplies left front wheel brake 25 and right rear wheel brake 27. Similarly, master cylinder pressure input line 22 supplies right front wheel brake 24 and left rear wheel brake 26. Although the system is arranged in a diagonally split manner, a plurality of other braking supply arrangements are possible and the present embodiment is intended merely to demonstrate the manner of fluid pressure regulation provided by the present invention.

The master cylinder pressure input lines 21 and 22 do not extend directly to the wheel brakes 24–27 themselves, but rather are routed through isolation valves 30, 31, 32 and 33. The isolation valves 30–33 are spring biased to a normal position wherein the master cylinder pressure input line 21 is in communication, through isolation valve 31 and pressure output line 36, with wheel brake 25, and through isolation valve 33 and pressure output line 38, with wheel brake 27. Similarly, the master cylinder pressure input line 22 is normally in communication, through isolation valve 30 and pressure output line 35, with wheel brake 24, and through isolation valve 32 and pressure output line 37, with wheel brake 26. In the "three way" isolation valves 30–33, pressure is certain to be directed to the wheel brakes 24–27 because of the integral check feature 61–64. In this base brake mode, which is the default mode, a normally open connection to the wheel brakes 24–27 through the isolation valves 30–33 is provided so that manual actuation of the master cylinder 12 through the application of force to brake pedal 15 as intensified by hydraulic power booster 11 is certain to provide vehicle braking.

The hydraulic power booster 11 includes an open fluid line 8 that communicates with the fluid reservoir 14 for fluid make-up and return requirements. The power supply for the hydraulic power booster 11 includes an accumulator 42 which maintains fluid pressure generated by pump assembly 40. When the brake pedal is actuated, fluid pressure is transmitted through line 23 and applied to an internal piston (not illustrated), of the hydraulic power booster 11 for power operation of the master cylinder 12.

In addition to the capability of manually actuating the braking system 10 through the master cylinder 12 and hydraulic power booster 11, a system of power operation exists which is capable of automatic control. Powered brake actuation is provided through the motor driven pump assembly 40. The input of the pump assembly 40 is connected to the reservoir 14 through line 71 to provide necessary fluid make-up and return requirements. The outlet of the pump assembly 40 is connected to port 80 of accumulator 42.

Accumulator 42 comprises a gas chamber 81 and a fluid chamber 82 separated by a slidable piston 83. In addition to the port 80, the accumulator includes a second port 84 that serves as an outlet downstream of the port 80 in the pump pressure input line 41. Providing a two-port accumulator 42 results in pump noise attenuation at the accumulator 42. This is accomplished by means of routing all output fluid from the pump assembly 40 into the fluid chamber 82 which permits volumetric expansion by movement of the piston 83 to compress the gas chamber 81. Noise damping occurs in the fluid chamber 82. Therefore, the accumulator 42 provides the dual functions of attenuating pump noise and providing a fluid pressure reservoir for the pressure input line 41.

Fluid pressure in the pump pressure input line 41 is monitored by pressure transducer 86 for use in establishing a desired level of pressure charge in the fluid chamber 82 of accumulator 42. The pressure charge is maintained by a positive shut-off feature of the supply valve 47 which is positioned in pump pressure input line 41 downstream of accumulator 42. The supply valve 47 separates the pressure rail side 88 of pump pressure input line 41 from the charged side 87 of pump pressure input line 41. A pressure regulation line (not illustrated), may extend between the charged side 87 of pump pressure input line 41 and the system return 89.

In the deenergized position, supply valve 47 ensures that the charged side 87 of pump pressure input line 41 is securely sealed off from the pressure rail side 88. The pressure rail side 88 distributes the pump pressure input line 41 to proportional valves 51, 52, 53 and 54. The pump pressure input line 41 extends through its pressure rail side 88 to the proportional valves 51–54 resulting in control of the fluid pressure reaching the isolation valves 30–33. Pressure in the modulated pump pressure input line segments 56, 57, 58 and 59 is controlled by operation of the proportional valves 51–54. Pressure balancing lines 67 and 68 extend between the modulated segments 56,57 and 58,59 respectively, of pump pressure input line 41. A spring centered piston unit 70 ensures fluid separation in the pressure balancing line 67. Similarly, a spring centered piston unit 71 ensures fluid separation in the pressure balancing line 68.

The spring centered piston unit 70 includes a body 72 having a main bore 73. A spool shaped piston 74 is slidably and sealingly carried in the bore 73. The segment 75 of pressure balancing line 67 communicates between modulated segment 56 and chamber 76 defined in bore 73. The segment 69 of pressure balancing line 67 communicates between modulated segment 57 and chamber 77 defined in bore 73. A third chamber 78 is defined by the piston 74 in bore 73. The chamber 78 continuously communicates with the reservoir 14 through the return 89 and vent line 91. Any fluid pressure inadvertently passing the seals (not shown), of piston 74 from chambers 76 or 77 to chamber 78 is vented to the reservoir 14.

Piston 74 is normally held in a centered position in bore 73, relative to the stops 92,93 by springs 94 and 95. When a pressure differential exists between modulated segments 56 and 57 the piston 74 slides, compressing the spring 94 or 95 to balance the pressure. When the pressure differential exceeds a predetermined value, the piston 74 engages the stop 92 or 94 so that an intended target pressure differential is achievable.

The spring centered piston unit 71 is substantially the same as the spring centered piston unit 70. A piston 101 separates out three chambers 102–104 within the spring centered piston unit 71. The segment 105 of pressure balancing line 68 communicates between modulated segment 58 and chamber 102. The segment 106 of pressure balancing line 67 communicates between modulated segment 59 and chamber 103. Chamber 104 continuously communicates with the reservoir 14 through the return 89 and the vent line 79.

Piston 101 is normally held in a centered position, relative to the stops 107,108 by a pair of springs. When a pressure differential exists between modulated segments 58 and 59 the piston 101 slides to balance the pressure. When the pressure differential exceeds a predetermined value, the piston 101 engages the stop 107 or 108 so that an intended target pressure differential is achievable.

In normal base brake operation of the braking system 10, the manual application of force on the brake pedal 15 results in actuation of the wheel brakes 24–27. The manual force is transmitted through the push rod 17 to the hydraulic power booster 11. The hydraulic power booster 11 utilizes the fluid pressure maintained by accumulator 42 to intensify the manually applied force for power actuation of the master cylinder 12. The manually actuated and power boosted operation of master cylinder 12 results in pressurization of the master cylinder pressure input lines 21 and 22 through the output ports 16 and 18. Fluid pressure is transmitted through the isolation valves 30–33 directly to the wheel brakes 24–27. The integral checks 61–64, prevent the transmission of pressure to the modulated segments 56–59. This isolates the spring centered piston units 70 and 71 from the master cylinder 12 and the wheel brakes 24–27. Therefore, movement of the pistons 74 and 101 does not affect the base brake design and operation.

In automatic power braking operation of the braking system 10, to slow the associated vehicle, the motor 40 is powered into operation and the supply valve 47 is energized and shifted to its open position. This pressurizes the pressure rail side 88 of the pump pressure input line 41. The isolation valves 30–33 are energized and shifted to provide open fluid communication between the modulated segments 56–59 and the pressure output lines 35–38. The integral check features 61–64 prevent the transmission of fluid pressure to the master cylinder 12 and the master cylinder pressure input lines 21 and 22.

Providing fluid pressure to actuate the wheel brakes 24–27 is achieved by operating the proportional valves 51–54 which are actuated to effect a target braking pressure. The target braking pressure is set by a programmable electronic controller (not illustrated), which utilizes various data. Open communication is provided through the isolation valves 30–33 since they have been shifted to an actuated position. Any side to side pressure variation that could result by independent operation of the proportional valves 51–54 is avoided by operation of the spring centered piston units 70 and 71. Therefore, during automatic power braking operation to slow the vehicle, the fluid pressure applied to the front wheel brakes 24 and 25 is substantially equal. Similarly, the fluid pressure applied to the rear wheel brakes 26 and 27 is substantially equal.

The accumulator 42, which is provided to cooperate with the pump 40 in maintaining a consistent minimum pressure in charged side 87 of pump pressure input line 41, ensures that upon the immediate actuation of supply valve 47, pressure exists to charge the pressure rail side 88 and is available for braking needs to the wheel brakes 24–27 without waiting for pressure to build in response to the operation of pump 40. The securely closing supply valve 47 ensures that the pressure maintained on charged side 87 is not lost during braking inactivity.

In addition to normal base brake operation, the braking system 10 is capable of providing anti-lock braking, traction control, vehicle handling augmentation through stability enhancement control, and automatic power braking operation to slow the vehicle. For anti-lock braking functions during base brake applies, the proportional valves 51–54 are independently shiftable to control pressure release from the wheel brakes 24–27. This is effected while the necessary isolation valve(s) 30–33 are energized to provide an open flow path between the involved pressure supply line(s) 35–38 and the respective modulated segment(s) 56–59.

For traction control operation, automatic response to various vehicular sensors (not illustrated) independent of actuation of the brake pedal 15 the pump 40 is provided. The braking system 10 is pressurized through the supply valve 47 which is shifted to its actuated position charging the pressure rail side 88 of pump pressure input line 41. Braking pressure is available at the proportional valves 51–54, each of which is independently actuated to effect braking pressure at any selected wheel brake 24–27 through its associated isolation valve 30–33 which is shifted to its actuated position by the electronic controller.

Essentially the same actuation of the wheel brakes 24–27 is effected in response to various sensor inputs to enhance vehicle stability and maneuverability. The traction control and stability enhancement control operation is enhanced by the rapid response time of the system wherein the charged side 87 of the pump pressure input line 41 remains available to effect braking response at any of the wheel brakes 24–27 without waiting for pressure build to occur as a result of operation of pump 40.

In operation, the proportional valves 51–54, provide braking pressure to the wheel brakes 24–27 in response to the electronic controller which receives various sensor input data including that from the pressure transducer 19. Operation of the isolation valves 30–33, helps provide an effective and low cost method of isolating the master cylinder 12 from the wheel brakes 24–27, automatic power braking function operation in a relatively simple manner. The positive shut-off feature provided by the discharge valve 47 ensures that the braking system 10 is capable of responding quickly to any brake actuation requirements. During ABS release operation, any apply pressure feed from the master cylinder 12, through the integral check feature of the isolation valves 30–33 is released to the system return 89 through the corresponding proportional valve(s) 51–54.

We claim:

1. A braking system comprising:

a pump operable to provide a pressurized fluid supply;

a first wheel brake;

a second wheel brake;

a conduit connected with the pump and having a first branch communicating with the first wheel brake and a second branch communicating with the second wheel brake;

a first proportional pressure regulation valve connected in the first branch;

a second proportional pressure regulation valve connected in the second branch; and a piston unit connected between the first and second branches to provide fluid pressure equalization therebetween.

2. A braking system according to claim 1 wherein the piston unit includes a piston slidably contained in a bore and normally held in a centered position by a pair of springs.

3. A braking system comprising:

a master cylinder operable to provide a first pressurized fluid supply;

a split channel braking circuit Connected to the master cylinder including a first and a second channel;

a first wheel brake connected in the first channel;

a second wheel brake connected in the second channel;

a first isolation valve having first, second and third ports connected in the first channel with the first port communicating with the master cylinder and the second port communicating with the first wheel brake;

a second isolation valve having fourth, fifth and sixth ports connected in the second channel with the fourth port communicating with the master cylinder and the fifth port communicating with the second wheel brake;

a pump operable to provide a second pressurized fluid supply;

a conduit connected with the pump and having a first branch communicating with the third port and a second branch communicating with the sixth port;

a first proportional pressure regulation valve connected in the first branch;

a second proportional pressure regulation valve connected in the second branch; and a piston unit connected between the first and second branches including a piston with a first side exposed to a first fluid pressure in the first branch and a second side exposed to a second fluid pressure in the second branch wherein the piston is movable providing fluid pressure equalization between the first and second branches.

4. A braking system according to claim 3 wherein the piston unit includes a piston slidably contained in a bore and normally held in a centered position by a pair of springs.

5. A braking system according to claim 4 wherein the piston unit includes a pair of stops and wherein the piston in slidable between the stops when the pump provides pressurized fluid to the wheel brakes through the proportional pressure regulation valves.

6. A braking system comprising;

a master cylinder operable to provide a first pressurized fluid supply;

a split channel braking circuit connected to the master cylinder including a first and a second channel;

a first wheel brake connected in the first channel;

a second wheel brake connected in the second channel;

a first isolation valve having first, second and third ports connected in the first channel with the first port communicating with the master cylinder and the second port communicating with the first wheel brake;

a second isolation valve having fourth, fifth and sixth ports connected in the second channel with the fourth port communicating with the master cylinder and the fifth port communicating with the second wheel brake;

a pump operable to provide a second pressurized fluid supply;

a conduit connected with the pump and having a first branch communicating with the third port and a second branch communicating with the sixth port;

a supply valve positioned in the conduit to selectively isolate the pump from the first and second branches;

a first proportional pressure regulation valve connected in the first branch;

a second proportional pressure regulation valve connected in the second branch; and a piston unit connected between the first and second branches including a piston with a first side exposed to a first fluid pressure in the first branch and a second side exposed to a second fluid pressure in the second branch wherein the piston is movable providing fluid pressure equalization between the first and second branches;

wherein the first isolation valve provides communication between the first and second ports and isolates the third port, and the second isolation valve provides communication between the fourth and fifth ports and isolates the sixth port when the master cylinder provides pressurized fluid to the first and the second wheel brakes, and wherein the first isolation valve provides communication between the third and second ports and isolates the first port, and the second isolation valve provides communication between the sixth and fifth ports and isolates the fourth port when the proportional pressure regulation valve provides pressurized fluid to the first and the second wheel brakes.

7. A braking system according to claim 6 wherein the piston unit includes a piston slidably contained in a bore and normally held in a centered position by a pair of springs.

8. A braking system according to claim 7 wherein the piston unit includes a pair of stops and wherein the piston in slidable between the stops when the pump provides pressurized fluid to the wheel brakes through the proportional pressure regulation valves.

9. A braking system comprising:

a first wheel brake;

a second wheel brake;

a pump providing a pressurized fluid supply to actuate the first and second wheel brakes through a first conduit extending between the pump and the first wheel brake and through a second conduit extending between the pump and the second wheel brake wherein the first conduit carries fluid at a first fluid pressure and the second conduit carries fluid at a second fluid pressure; and a third conduit extending between the first conduit and the second conduit containing a piston unit having a piston wherein the piston includes a first side exposed to the first fluid pressure and a second side exposed to the second fluid pressure wherein the piston moves equalizing pressure between the first and the second conduits.

10. A brake system according to claim 9 further comprising a first control valve disposed in the first conduit modulating the pressurized fluid supply delivered from the pump to the first wheel brake and a second control valve disposed in the second conduit modulating the pressurized fluid supply delivered from the pump to the second wheel brake wherein when a target pressure differential between the first wheel brake and the second wheel brake is set by the first and the second control valves to be greater than a predetermined value, the piston engages a stop so that the target pressure differential is achieved.

* * * * *